Patented June 9, 1953

2,641,551

UNITED STATES PATENT OFFICE 2,641,551

METAL COATING COMPOSITION

Herschel G. Smith, Wallingford, Troy L. Cantrell, Lansdowne, and Earl E. Fisher, Yeadon, Pa., assignors to Gulf Oil Corporation, Pittsburgh, Pa., a corporation of Pennsylvania No Drawing. Application July 20, 1949, Serial No. 105,902

8 Claims. (Cl. 106—14)

This invention relates to a metal coating composition and more particularly to a coating composition having a bituminous base and having improved properties for use in coating metal surfaces.

Metallic parts and materials composed of metal are subject to oxidation and corrosion upon storage, especially those containing iron or ferrous alloys. Heretofore it has been customary to protect these parts against corrosion by applying a protective film such as may be produced by grease-like compositions, by plastic compositions such as pyroxylin type films or by asphalt base varnishes. The grease-like materials have been found unsatisfactory because of their poor resistance to abrasion, melting and other conditions encountered during storage. The asphalt varnishes and plastic coatings are satisfactory as regards protection against oxidation but these compositions are extremely difficult to remove from the metal surfaces. Furthermore, decomposition of the components of the coating compositions themselves may free acids which react with the metal-containing base to form metallic soaps. This is particularly true when, as is often the case, the coating composition contains as an additive a soap of a metal which is replaceable by iron.

An object of our invention is to provide an improved coating composition for use with metallic surfaces which is highly resistant to abrasion and melting, which is highly adhesive, and which is easily removable after long periods of weathering.

It is a further object of our invention to provide an improved coating composition which possesses superior resistance to cracking and checking.

Another object is to provide a composition the constituents of which are resistant to oxidation.

Still another object is to provide a composition which contains therein a material which will inhibit the corrosive effects of various impurities or decomposition products contained in the composition.

These and other objects are accomplished by the coating composition of our invention which comprises asphalt, microcrystalline wax, and a relatively small amount of a primary fatty amine salt of 3-methylbutyl, 2-ethylhexyl ortho phosphoric acid. A filler and a resinous material acting as a plasticizer may be added if desired. A common solvent for all materials except the filler may be employed to produce a liquid composition.

In the following examples and description we have set forth several of the preferred embodiments of our invention but it is to be understood that they are given by way of illustration and not in limitation thereof.

Satisfactory asphalts which may be used in our composition are those having melting points between about 130° F. and about 210° F. Blown asphalts of the melting range described are particularly preferred. One typical blown asphalt which may be used in our composition has the following properties:

| | Typical Test | Manufacturing Specifications |
|---|---|---|
| Blown Asphalt Test When Blown to Melting Point, ° F., Ring and Ball | 200 | 200 |
| Penetration, ASTM D5-25, 77° F., 100G., 5 Sec. | 12 | 9-15 |

A typical microcrystalline wax which may be used in our invention conforms to the following specifications:

| | Typical Test | Manufacturing Specifications |
|---|---|---|
| Gravity; Liquid State, °API, Theor | 34.6 | |
| Melting Point, ° F., Petrolatum, ASTM D127-30 | 168 | (160-170) |
| Penetration, ASTM D217-44T, 77° F., 150 G., 5 Sec., Unworked | 10 | |
| Penetration, ASTM D5-25, 77° F., 200 G., 5 Sec. | 40 | (Max. 50) |
| Viscosity, SUV, 210° F | 71.5 | (65-75) |
| Flash, P-M, ° F | 505 | |
| Flash, OC, ° F | 505 | (Min. 500) |
| Fire, OC, ° F | 595 | |
| Pour Point, ° F | +155 | |
| Color, Solid State | (1) | |
| Appearance | (2) | |
| Water by Dist'n, percent by Wt | nil | (Max. 1.0) |
| Carbon Residue, Percent | 0.43 | |
| Neutralization No | 0.07 | |
| Iodine No., Mod. Hanus | 4.3 | (Max. 7.0) |

[1] Greenish brown.
[2] Smooth (smooth, not greasy).

Other microcrystalline waxes may be used which have melting points varying from about 100° F. to about 300° F. The function of the wax is that it acts as a plasticizer for the asphalt, thus producing a more pliable product.

A corrosion inhibitor comprising a primary fatty amine salt which is the substantially neutral addition product of 3-methylbutyl, 2-ethylhexyl ortho phosphoric acid and a primary fatty amine having from 8 to 18 carbon atoms, and which may be prepared according to the method set forth in United States Patent 2,387,537, issued October 23, 1945, to Herschel G. Smith and Troy L. Cantrell, is also employed in our composition. This substance has a two-fold function. First, it is specific as a corrosion inhibitor and prevents any corrosive impurities in the coating composition from attacking the metal surface. We have also found that this composition, when incorporated in the composition of our invention, produces the unexpected result of preventing gelling of the composition and also that of reducing its viscosity, thus enabling the composition to be more easily applied.

The preferred aspect of our invention involves the use of a common solvent to dissolve all of the components of our composition or to form a liquid composition. One suitable solvent is Stoddard solvent. However, other light hydrocarbon solvents, such as gasoline, may be employed. In fact any easily volatile solvent which will dissolve the ingredients of our composition sufficiently to form a relatively uniform liquid mixture may be employed. Some further examples of satisfactory solvents are turpentine and similar terpene type solvents, mixtures of aliphatic, aromatic, and naphthenic type hydrocarbons, mixtures of higher alcohols and hydrocarbons, and mixtures of ketones and hydrocarbons. In certain individual cases ketones and alcohols may be employed as the solvent. However, in general we prefer to use these in conjunction with hydrocarbon solvents.

An optional ingredient which may be included in our composition is a low molecular weight resinous compound. The resinous material when utilized in our invention also has as its function that of plasticizer for the asphalt. The addition of the resin to the asphalt-wax mixture produces a rubber-like composition. The resinous material is one selected from the group consisting of hydrogenated rosin, rosin and coumarone indene resin.

The coumarone indene resin which is useful for this purpose possesses excellent solubility in naphtha base petroleum solvents. This material is polymeric in form and is thought to be a chain structure having one terminal double bond per mol. However, there is some evidence to indicate that the structure might be cyclic. A satisfactory coumarone indene resin for our invention has the following properties:

| | |
|---|---|
| Sp. Gr., 15.6°/15.6° C. | 1.130 |
| Flash, OC: °F. | 515 |
| Fire, OC: °F. | 585 |
| Refractive index 25° C. | 1.620 |
| Fracture | conchoidal |
| Appearance | amber, brittle solid |
| Molecular weight | 480–700 |
| Melting point: °C. | 110–142 |

A suitable hydrogenated rosin for use in our coating composition is sold under the name of "Staybellite" and has the following properties:

| | |
|---|---|
| Acid No. | 155–165 |
| Color | K–WW |
| Melting point: °F. | |
| Dropping method | 165–175 |
| Saturation: per cent by weight | min. 60 |

Rosin or colophony useful in this invention has the following properties:

| | |
|---|---|
| Sp. Gr., 60°/60° F. | 1.08 |
| Melting point: °C. | 100–150 |
| Chief constituents: | isomeric forms of the anhydride of abietic acid |
| Grades | B. to W. W. |

Another component which may be included in our composition when desired is a finely comminuted filler. The functions of this material are those usually attributed to fillers and principally that of adding bulk to the composition. Satisfactory fillers which have been employed by us are mica, aluminum powder and graphite. Other inert fillers such as titanium dioxide or various other conventional paint pigments may be employed with equal facility. The particles of filler are desirably of a size less than about 150 mesh.

In preparing our composition for use, the individual components may be added in any order. When a solvent is used the components may be dissolved in the solvent at room temperature. If desired, the mixture may be heated to a temperature above about 100° F., depending upon the particular solvent used, in order to hasten melting or solution. Any temperature between room temperature and decomposition temperature may be used. Of course, if a solvent is not used in preparing the composition, the minimum temperature would be that necessary to cause melting and uniform intermixture.

Our improved composition, in a preferred embodiment, is made up of the following ingredients:

(1) A blown asphalt such as grade B asphalt of from 15 to 30 per cent.

(2) A high melting point amorphous or microcrystalline wax of from 5 to 10 per cent.

(3) A filler, such as aluminum, mica, graphite, titanium dioxide, or the usual paint pigments of from 0 to 25 per cent.

(4) A resinous material selected from the group consisting of hydrogenated rosin, coumaroneindene resin and rosin of from 0 to 10 per cent.

(5) A relatively volatile naphtha base solvent, such as Stoddard solvent, of from 44 to 60 per cent.

(6) A substantially neutral addition product of 3-methylbutyl, 2-ethylhexyl ortho phosphoric acid and a primary fatty amine having 8 to 18 carbon atoms which may be prepared according to the method set forth in U. S. Patent 2,387,-537, issued October 23, 1945 to Herschel G. Smith and Troy L. Cantrell in amounts varying from about 0.01 per cent to 2 per cent.

Specific examples of my composition are as follows:

*Example I*

Make-up: per cent by weight

| | |
|---|---|
| Grade B asphalt | 17.5 |
| Petrowax B | 7.0 |
| Coumarone indene resin | 7.0 |
| Dodecyl amine salt of 3-methylbutyl, 2-ethylhexyl ortho phosphoric acid | 0.5 |
| Aluminum powder | 14.0 |
| Stoddard solvent | 54.0 |

A metallic panel was coated with the composition described above and the coating allowed to dry. The coated panel was then subjected to the conditions in a humidity cabinet and a weatherometer. The following results were observed:

Inspection:
| Humidity cabinet test (100% relative humidity at 120° F.) AN-H-31— | | |
|---|---|---|
| Panel No | 659 | 664. |
| Position | B-2Y | B-3Y. |
| Time of test (days) | 34 | 54. |
| Result | pass | pass. |
| Weatherometer— | | |
| Panel No | 679 | 678. |
| Position | B-10 | B-9. |
| Time of test (hrs.) | 1,176 | 408. |
| Result | pass | pass. |
| Solubility after Weatherometer Exposure | very soluble | very soluble. |

Example II

Make-up: per cent by weight
- Grade B asphalt _____ 17.5
- Petrolatum No. 5 _____ 7.0
- Staybellite* _____ 7.0
- Dodecyl amine salt of 3-methylbutyl, 2-ethylhexyl ortho phosphoric acid__ 0.5
- Aluminum powder_____ 14.0
- Stoddard solvent_____ 54.0

* Hydrogenated rosin furnished by Hercules Powder Co.

A metallic panel was coated with the composition described above and the coating allowed to dry. The coated panel was then subjected to the conditions in a humidity cabinet and a weatherometer. The following results were observed:

Inspection:
| Humidity cabinet test (100% relative humidity at 120° F.) AN-H-31— | | |
|---|---|---|
| Panel No | 685 | 708. |
| Position | B-6Y | B-7Y. |
| Time of test (days) | 34 | 54. |
| Result | pass | pass. |
| Weatherometer— | | |
| Panel No | 638 | 639. |
| Position | B-15 | B-16. |
| Time, length of test (hrs.) | 1,176 | 408. |
| Result | pass | pass. |
| Solubility after Weatherometer Exposure | very soluble | very soluble. |

Example III

Make-up: per cent by weight
- Grade B asphalt_____ 17.5
- Petrowax B_____ 7.0
- Amber rosin_____ 7.0
- Dodecyl amine salt of 3-methylbutyl, 2-ethylhexyl ortho phosphoric acid__ 0.5
- Aluminum powder_____ 14.0
- Stoddard solvent_____ 54.0

A metallic panel was coated with the composition described above and the coating allowed to dry. The coated panel was then subjected to the conditions in a humidity cabinet and a weatherometer. The following results were observed:

Inspection:
| Humidity cabinet test (100% relative humidity at 120° F.) AN-H-31— | | |
|---|---|---|
| Panel No | 936 | 933. |
| Position | B-11X | C-5X. |
| Time, length of test (days) | 30 | 30. |
| Result | pass | pass. |
| Weatherometer— | | |
| Panel No | 852 | 853. |
| Position | B-21 | B-1. |
| Time, length of test (hrs.) | 1,200 | 538. |
| Result | pass | pass. |
| Solubility after Weatherometer Exposure | very soluble | very soluble. |

Example IV

Make-up: per cent by weight
- Grade B asphalt_____ 15.35
- Petrowax B_____ 6.15
- Coumarone indene resin_____ 6.15
- Dodecyl amine salt of 3-methylbutyl, 2-ethylhexyl ortho phosphoric acid_ 0.45
- Mica _____ 24.55
- Stoddard solvent_____ 47.35

A metallic panel was coated with the composition described above and the coating allowed to dry. The coated panel was then subjected to the conditions in a humidity cabinet and a weatherometer. The following results were observed:

Inspection:
| Humidity cabinet test (100% relative humidity at 120° F.) AN-H-31— | | |
|---|---|---|
| Panel No | 654 | 686. |
| Position | B-10Y | B-11Y. |
| Time, length of test (days) | 34 | 54. |
| Result | 50% | pass. |
| Weatherometer— | | |
| Panel No | 637 | 611. |
| Position | B-19 | B-20. |
| Time, length of test (hrs.) | 1,176 | 408. |
| Result | pass | pass. |
| Solubility after Weatherometer Exposure | very soluble | very soluble. |

Example V

Make-up: per cent by weight
- Grade B asphalt_____ 17.5
- Petrowax B_____ 7.0
- Coumarone indene resin_____ 7.0
- Dodecyl amine salt of 3-methylbutyl, 2-ethylhexyl ortho phosphoric acid__ 0.5
- Graphite _____ 14.0
- Stoddard solvent_____ 54.0

A metallic panel was coated with the composition described above and the coating allowed to dry. The coated panel was then subjected to the conditions in a humidity cabinet and a weatherometer. The following results were observed:

Inspection:
| Humidity cabinet test (100% relative humidity at 120° F.) AN-H-31— | | |
|---|---|---|
| Panel No | 680 | 731. |
| Position | C-1Y | C-2Y. |
| Time, length of test (days) | 34 | 54. |
| Result | 10% | pass. |
| Weatherometer— | | |
| Panel No | 633 | 630. |
| Position | B-21 | B-22. |
| Time, length of test (hrs.) | 592 | 363. |
| Result | pass | pass. |
| Solubility after Weatherometer Exposure | very soluble | very soluble. |

The Humidity Cabinet Corrosion Test produces a moisture saturated atmosphere of 120° F., with continuous condensation on the test specimens and is used for testing coating materials intended as corrosion preventives. This cabinet was designed to meet the requirements of Army-Navy Aeronautical Standard Specification No. AN-H-31.

The weatherometer used was a National Carbon Weathering Unit Model No. X-1-A. It is designed for exposing test samples to artificial sunlight or intense ultra-violet radiation under accurately controlled conditions. The source of radiation is a carbon arc lamp, about which the test samples are slowly carried during the test. Two spray nozzles permit the sample to be wet during a part of each revolution. The combined weathering effects of water, air, light and thermal shock are thus applied at fixed intensities. The air temperature in the weatherometer on the side opposite the spray is approximately 116° F. The rack on which the specimens are hung rotates once in two hours. During this rotation, each specimen is sprayed 20 minutes with fresh water.

It should be noted in connection with the results obtained in the weatherometer tests that most conventional asphalt base coating compositions fail after about 10 hours under these conditions and that virtually all of them fail before about 100 hours.

Our improved coating composition, as illustrated in the examples above, is characterized by the following properties:

1. Maximum resistance to weathering with a minimum of film thickness.
2. Film thickness 0.001" to 0.004".
3. Excellent adhesion at low and high temperatures.
4. More resistant to erosion than the usual naphtha-soluble, non-oxidizing coatings of similar type.
5. A marked increase in resistance to cracking, checking and alligatoring.
6. Dries to a coating in 4 hours; easily handled.
7. High degree of flexibility at low operating temperatures, as shown in knee-action coil springs.
8. May be applied by brushing, dipping or spraying.
9. Repairs are easily made to assembled mechanisms which have been preserved with these coatings.
10. Coating prevents rusting of bolt threads, and in addition is easily removed because of the lubricating properties of the composition.
11. Coating remains naphtha-soluble after weathering.

A suitable method of utilizing the composition of our invention is as follows:

The metal surface to be coated should first be cleaned to remove surface impurities such as pickling by-products, finger prints, or traces of other moisture absorbing films. The cleaning may be carried out in any conventional manner known to the art, such as by swabbing with an alcohol or naphtha solvent. The coating material may then be applied by brushing, dipping or spraying, the viscosity of the composition having been varied to suit the particular method by controlling the amount of solvent added.

While we have described the preferred form of our invention as involving a liquid solution, it will be clear from the foregoing that we also contemplate a composition prepared without the use of a solvent. Such a composition is desirable since the difficulties attending the shipment of liquids may be avoided. While we have described microcrystalline wax as particularly useful in connection with our invention, any other wax which has its functional properties may be used. Similarly our invention is not limited to the use of Stoddard solvent. Any relatively volatile solvent of the type listed above, which is a common solvent for the materials of our composition, may be employed. The specific percentage range for the corrosion inhibitor is merely preferred and is not to be considered limiting, since in certain instances an amount less than 0.01% may be employed. Also an amount greater than 2.0% may be employed but the advantages thus produced do not warrant any substantial increase above 2.0%.

The coating composition described herein may be used to protect metal surfaces of metal parts which are to be stored before using. By use of our composition the parts may be maintained in their condition as prepared for an indefinite period of time. Because of the ease of removal of our improved composition the protective coating may be removed whenever desired with a minimum amount of work.

These coatings have also found particular utility as automobile undercoatings. In this particular application they have been subjected for long periods of time to both summer and winter weather conditions. When employed in this manner these compositions have provided excellent protection to the metal surfaces so coated and were easily removed for repair of the automobile parts after such long periods of time.

One advantage of our invention is the provision of a protective film which is highly adhesive to metal and has excellent weathering characteristics for minimum film thickness at both high and low temperatures. Another advantage of our composition is that it provides excellent resistance to abrasion, corrosion and weathering. Still another advantage of the composition is that it produces a marked improvement in resistance to checking and cracking. A further advantage is that the coating material remains easily soluble in light hydrocarbon solvents after long periods of weathering. A still further advantage is that the composition dries quickly, i. e., in about four hours.

What we claim is:

1. A liquid coating composition of the class described consisting essentially of from about 15 to 30 per cent asphalt, about 5 to 10 per cent microcrystalline wax, and 0.01 to 2 per cent of a primary fatty amine salt of 3-methylbutyl, 2-ethylhexyl orthophosphoric acid dissolved in a solvent.

2. A coating composition in accordance with claim 1, which contains additionally up to 25 per cent of a filler and up to 10 per cent of a low molecular weight resinous material selected from the group consisting of hydrogenated rosin, rosin and coumarone indene resin.

3. A liquid coating composition of the class described consisting essentially of from about 15 to 30 per cent blown asphalt, about 5 to 10 per cent microcrystalline wax, up to 25 per cent filler, up to 10 per cent of a low molecular weight resinous material selected from the group consisting of hydrogenated rosin, rosin and coumarone indene resin 0.01 to 2 per cent of a primary fatty amine salt of 3-methylbutyl, 2-ethylhexyl orthophosphoric acid, and a solvent.

4. A composition in accordance with claim 3, wherein the resinous material is hydrogenated rosin.

5. A composition in accordance with claim 3, wherein the resinous material is rosin.

6. A composition in accordance with claim 3, wherein the resinous material is a coumarone indene resin.

7. A composition in accordance with claim 3, wherein the solvent is a hydrocarbon-containing solvent.

8. A liquid coating composition containing the following constituents in approximately the following percentage proportions:

| | |
|---|---|
| Blown asphalt | 17.5 |
| Microcrystalline wax | 7.0 |
| Low molecular weight resin | 7.0 |
| Dodecylamine salt of 3-methylbutyl, 2-ethylhexyl orthophosphoric acid | 0.5 |

Aluminum powder _____ 14.0
Stoddard solvent _____ 54.0 said low molecular weight resin being selected from the group consisting of hydrogenated rosin, rosin and coumarone indene resin.

HERSCHEL G. SMITH.
TROY L. CANTRELL.
EARL E. FISHER.

References Cited in the file of this patent

UNITED STATES PATENTS

| Number | Name | Date |
|---|---|---|
| 2,387,537 | Smith | Oct. 23, 1945 |
| 2,485,321 | Schiermeier | Oct. 18, 1949 |
| 2,492,848 | Crouch et al. | Dec. 27, 1949 |

FOREIGN PATENTS

| Number | Country | Date |
|---|---|---|
| 604,408 | Great Britain | July 2, 1948 |